United States Patent
Lindberg Nilsson et al.

(10) Patent No.: US 12,304,474 B2
(45) Date of Patent: May 20, 2025

(54) THREAT MITIGATION FOR VEHICLES

(71) Applicant: Ningbo Geely Automobile Research & Development Co., Ltd., Ningbo (CN)

(72) Inventors: Erik Lindberg Nilsson, Gothenburg (SE); Jonathan Johansson, Gothenburg (SE)

(73) Assignee: Ningbo Geely Automobile Research & Dev. Co., Ltd., Ningbo (CN)

(*) Notice: Subject to any disclaimer, the term of this patent is extended or adjusted under 35 U.S.C. 154(b) by 218 days.

(21) Appl. No.: 17/734,040

(22) Filed: Apr. 30, 2022

(65) Prior Publication Data
US 2022/0250617 A1 Aug. 11, 2022

Related U.S. Application Data

(63) Continuation of application No. PCT/CN2020/126062, filed on Nov. 3, 2020.

(30) Foreign Application Priority Data

Nov. 7, 2019 (EP) .................................. 19207664

(51) Int. Cl.
*B60W 30/095* (2012.01)

(52) U.S. Cl.
CPC . *B60W 30/0956* (2013.01); *B60W 2554/4042* (2020.02); *B60W 2554/4046* (2020.02); *B60W 2554/802* (2020.02); *B60W 2554/804* (2020.02)

(58) Field of Classification Search
CPC ..... B60W 30/0956; B60W 2554/4042; B60W 2554/4046; B60W 2554/802; B60W 2554/804; B60W 2554/40; B60W 2554/80; B60W 40/04; B60W 50/14; B60W 30/09; G08G 1/166
See application file for complete search history.

(56) References Cited

U.S. PATENT DOCUMENTS

| 10,037,699 B1 | 7/2018 | Toyoda |
| 2012/0083947 A1* | 4/2012 | Anderson ............ G08G 1/166 701/1 |

(Continued)

FOREIGN PATENT DOCUMENTS

| CN | 103158705 A | 6/2013 |
| CN | 109466535 A | 3/2019 |

(Continued)

OTHER PUBLICATIONS

Adam Brinklow, Mission District cabbie attacks self-driving car. The second such attack on a driving robot in the neighborhood in four weeks, 2018, Curbed San Francisco, pp. 1-2 (Year: 2018).*
International Search Report from corresponding International Application No. PCT/CN2020/126062, mailed on Feb. 10, 2021, 2 pages.
"Interactive Owner's Manual [In depth | Driving and parking | Driving systems]", Mercedes-Benz, Jun. 1, 2012, 45 pages inclusive of German language version.

(Continued)

*Primary Examiner* — Aniss Chad
*Assistant Examiner* — Chase L Cooley
(74) *Attorney, Agent, or Firm* — Tucker Ellis LLP

(57) ABSTRACT

A method for controlling a vehicle includes determining whether one or more surrounding vehicles demonstrate threatening behavior, and (when it is determined that one or more surrounding vehicles demonstrate threatening behavior) controlling the vehicle to perform one or more threat evasive actions. Example threatening behavior comprises a first surrounding vehicle directly in front of the vehicle slowing down in absence of traffic related reason to slow down, possibly in combination with a second surrounding vehicle in an adjacent lane to the vehicle slowing down in association with the first surrounding vehicle.

10 Claims, 2 Drawing Sheets

(56) References Cited

U.S. PATENT DOCUMENTS

| | | |
|---|---|---|
| 2013/0304514 A1 | 11/2013 | Hyde |
| 2018/0143642 A1* | 5/2018 | Kahn .................... G08G 1/166 |
| 2018/0201227 A1* | 7/2018 | Gao .................... B60R 25/305 |
| 2018/0307239 A1 | 10/2018 | Shalev-Shwartz |
| 2019/0210567 A1 | 7/2019 | Frederick et al. |
| 2019/0283763 A1 | 9/2019 | Wang |
| 2019/0315345 A1 | 10/2019 | Newman |
| 2021/0118295 A1* | 4/2021 | Visintainer ............ G08G 1/163 |

FOREIGN PATENT DOCUMENTS

| | | |
|---|---|---|
| CN | 109686124 A | 4/2019 |
| CN | 110171413 A | 8/2019 |
| EP | 3358548 A1 | 8/2018 |
| JP | 2005092727 A | 4/2005 |
| WO | 2013138000 A1 | 9/2013 |
| WO | 2014130178 A1 | 8/2014 |

OTHER PUBLICATIONS

"Interactive Owner's Manual [In depth | Safety | Driving safety systems]", Mercedes-Benz, Jun. 1, 2012, 11 pages inclusive of German language version.
Extended European Search Report from corresponding European Application No. 19207664.4, May 18, 2020, 10 pages.

\* cited by examiner

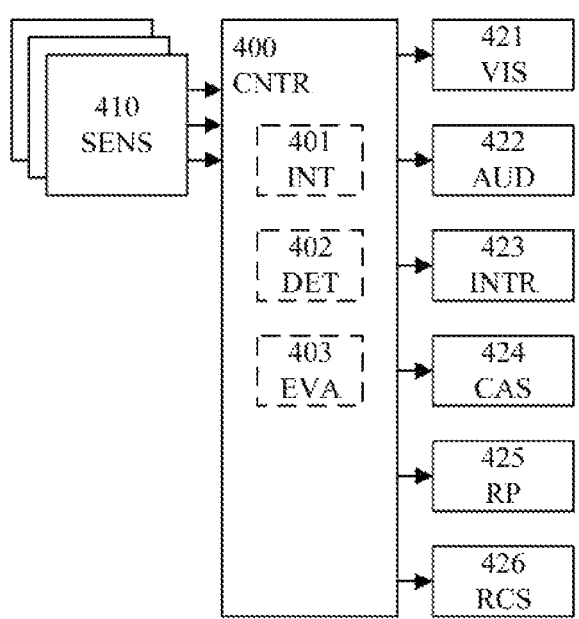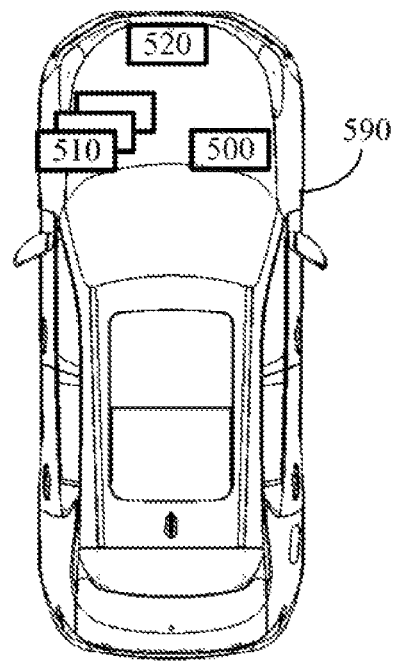
Fig. 4　　　　　　　　Fig. 5
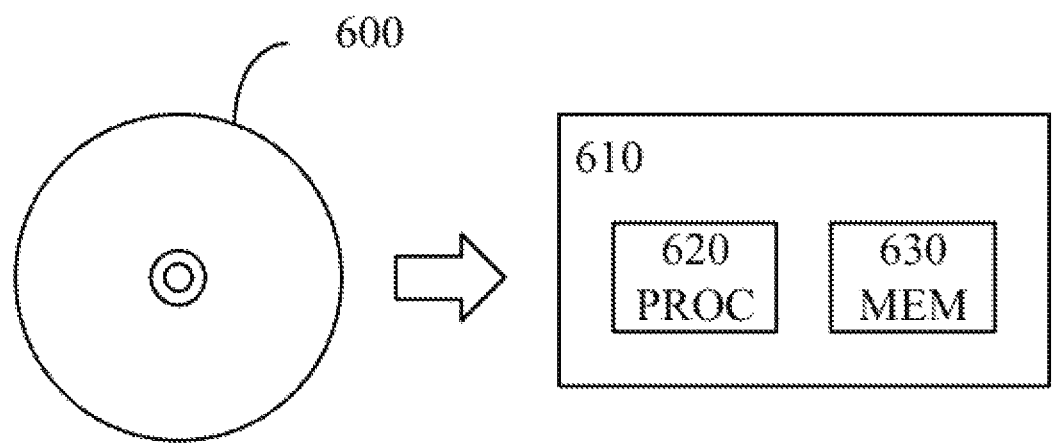
Fig. 6

THREAT MITIGATION FOR VEHICLES

RELATED APPLICATION DATA

This application is a continuation of International Patent Application No. PCT/CN2020/126062, filed Nov. 3, 2020, which claims the benefit of European Patent Application No. 19207664.4, filed Nov. 7, 2019, the disclosures of which are incorporated herein by reference in their entireties.

TECHNICAL FIELD

The present disclosure relates generally to the field of vehicle control. More particularly, it relates to vehicle control in threatening scenarios.

BACKGROUND

Threatening situations may occur involving a vehicle. An example is described in patent publication US 2018/0143642 A1 where multiple people surround a vehicle for carjacking or robbing. US 2018/0143642 A1 suggests providing an autonomous vehicle with an emergency escape mode for handling such situations.

While providing one possible threat mitigation approach, the emergency escape mode suggested by US 2018/0143642 A1 is not always sufficiently effective, or effective at all. Therefore, there is a need for additional or alternative threat mitigation approaches.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for controlling a vehicle. The method comprises determining whether one or more surrounding vehicles demonstrate threatening behavior, and (when it is determined that one or more surrounding vehicles demonstrate threatening behavior) controlling the vehicle to perform one or more threat evasive actions.

An advantage of this aspect is that a method is provided that enables mitigation of threatening behavior by surrounding vehicles.

In some embodiments, determining whether one or more surrounding vehicles demonstrate threatening behavior is based on information regarding surrounding vehicles acquired by one or more external sensors mounted on the vehicle, and interpretation of the information regarding surrounding vehicles to provide one or more threat determining metric associated with the one or more surrounding vehicles.

In some embodiments, the method further comprises acquiring information regarding surrounding vehicles from one or more external sensors mounted on the vehicle, and interpreting the information regarding surrounding vehicles to provide one or more threat determining metric associated with the one or more surrounding vehicles.

In some embodiments, the one or more threat determining metric associated with a surrounding vehicle comprise one or more of a speed of the surrounding vehicle, a velocity of the surrounding vehicle, a difference between speed of the surrounding vehicle and speed of the vehicle, a difference between velocity of the surrounding vehicle and velocity of the vehicle, a distance between the surrounding vehicle and the vehicle, and a trend of the distance between the surrounding vehicle and the vehicle.

An advantage of any of these embodiments is that determination of threatening behavior is enabled by means of suitable metric(s), thereby enabling accurate determination of whether or not surrounding vehicles behave threateningly.

In some embodiments, one or more surrounding vehicles demonstrating threatening behavior comprises a first surrounding vehicle directly in front of the vehicle slowing down in absence of traffic related reason to slow down.

In some embodiments, one or more surrounding vehicles demonstrating threatening behavior further comprises a second surrounding vehicle in an adjacent lane to the vehicle slowing down in association with the first surrounding vehicle.

An advantage of any of these embodiments is that certain threatening scenarios can be accurately recognized.

In some embodiments, controlling the vehicle to perform one or more threat evasive actions comprises controlling the vehicle to perform one or more of activating a visual deterrent maneuver, activating an audial deterrent maneuver, activating an intrusion mitigating maneuver, disabling a collision avoidance system, taking an available escape route, initiating an emergency call, and initiating a call to remote controller.

An advantage of any of these embodiments is that performance of threat evasive actions is enabled by suitable means, thereby providing effective and/or flexible threat mitigation.

A second aspect is a computer program comprising program instructions. The computer program is loadable into a data processing unit and configured to cause execution of the method according to the first aspect when the computer program is run by the data processing unit.

An advantage of this aspect is that a software implementation is provided of the method that enables mitigation of threatening behavior by surrounding vehicles.

A third aspect is a computer program product comprising a computer readable medium carrying a computer program comprising program instructions. The computer program is loadable into a data processing unit and configured to cause execution of the method according to the first aspect when the computer program is run by the data processing unit.

An advantage of this aspect is that a carrier is provided for the software implementing the method that enables mitigation of threatening behavior by surrounding vehicles.

A fourth aspect is a control unit for controlling a vehicle. The control unit is configured to cause execution of the method according to the first aspect.

An advantage of this aspect is that a hardware implementation is provided of the method that enables mitigation of threatening behavior by surrounding vehicles.

A fifth aspect is an apparatus for controlling a vehicle. The apparatus comprises controlling circuitry configured to cause determination of whether one or more surrounding vehicles demonstrate threatening behavior, and (responsive to determination that one or more surrounding vehicles demonstrate threatening behavior) control of the vehicle to perform one or more threat evasive actions.

An advantage of this aspect is that a physical apparatus is provided that enables mitigation of threatening behavior by surrounding vehicles.

In some embodiments, the controlling circuitry is further configured to cause acquisition of information regarding surrounding vehicles from one or more external sensors mounted on the vehicle, and interpretation of the information regarding surrounding vehicles to provide one or more threat determining metric associated with the one or more surrounding vehicles, wherein determination of whether one or more surrounding vehicles demonstrate threatening behavior is based on the one or more threat determining metric.

An advantage of any of these embodiments is that determination of threatening behavior is enabled by means of suitable metric(s), thereby enabling accurate determination of whether or not surrounding vehicles behave threateningly.

A sixth aspect is a system for controlling a vehicle. The system comprises one or more external sensors mountable on the vehicle and configured to acquire information regarding one or more surrounding vehicles, and processing circuitry.

The processing circuitry is configured to interpret the information regarding surrounding vehicles to provide one or more threat determining metric associated with the one or more surrounding vehicles, determine—based on the threat determining metric—whether one or more surrounding vehicles demonstrate threatening behavior, and (responsive to determination that one or more surrounding vehicles demonstrate threatening behavior) issue one or more control signals for controlling the vehicle to perform one or more threat evasive actions.

An advantage of this aspect is that a system is provided that enables mitigation of threatening behavior by surrounding vehicles.

In some embodiments, the one or more control signals for controlling the vehicle to perform one or more threat evasive actions comprise one or more control signals for controlling the vehicle to perform one or more of activating a visual deterrent maneuver, activating an audial deterrent maneuver, activating an intrusion mitigating maneuver, disabling a collision avoidance system, taking an available escape route, initiating an emergency call, and initiating a call to a remote controller.

In some embodiments, the system further comprises one or more of a visual interface, an audial interface, an intrusion mitigator, a collision avoidance system, a route planner, and a remote communication system.

An advantage of any of these embodiments is that performance of threat evasive actions is enabled by suitable means, thereby providing effective and/or flexible threat mitigation.

A seventh aspect is a vehicle comprising one or more of the control unit of the fourth aspect, the apparatus of the fifth aspect, and the system of the sixth aspect.

An advantage of this aspect is that a vehicle is provided that enables mitigation of threatening behavior by surrounding vehicles.

In some embodiments, any of the above aspects may additionally have features identical with or corresponding to any of the various features as explained above for any of the other aspects.

Various different criteria may be used to define whether surrounding vehicle(s) demonstrate threatening behavior. For example, it may be defined that surrounding vehicle(s) demonstrate threatening behavior when a probability that the surrounding vehicle(s) will be part of an upcoming criminal activity (e.g., towards the vehicle subject to control, and/or its occupants) exceeds a probability threshold. Such probabilities may, for example, be estimated based on statistics and/or machine learning. Examples of surrounding vehicle(s) demonstrating threatening behavior will be elaborated on later herein.

Various different criteria may be used to define threat evasive actions (i.e., threat mitigating actions). For example, a threat evasive action may be defined as any act that lowers a probability that upcoming—or ongoing—criminal activity (e.g., towards the vehicle subject to control, and/or its occupants) is commenced and/or carried through. Such probabilities may, for example, be estimated based on statistics and/or machine learning. Examples of threat evasive actions will be elaborated on later herein. The terms "threat evasion" and "threat mitigation" will be used interchangeably herein.

Generally, the vehicle subject to control may be an autonomous vehicle or a manually operable vehicle.

The vehicle subject to control is generally referred to herein as "a/the vehicle", but may alternatively be termed "a/the vehicle subject to control" or "a/the primary vehicle".

Also generally, any surrounding vehicle may be an autonomous vehicle or a manually operable vehicle.

Furthermore, any of the methods described herein may typically be fully, or partly, computer-implemented.

A general advantage of some embodiments is that threat mitigation approaches are provided.

An advantage of some embodiments is that threat mitigation may be improved (e.g., resulting in an increased probability to defer an ongoing criminal act).

Generally, the threat mitigation approaches according to some embodiments may be applied alone or in combination with other threat mitigation approaches (e.g., the emergency escape mode of US 2018/0143642 A1).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 4 is a schematic block diagram illustrating an example arrangement according to some embodiments;

FIG. 5 is a schematic drawing illustrating an example vehicle according to some embodiments; and FIG. 6 is a schematic drawing illustrating an example computer readable medium according to some embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described for controlling a vehicle to mitigate threatening situations involving one or more surrounding vehicles.

Figure 1:
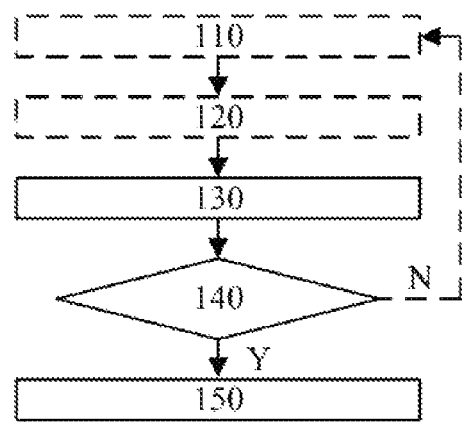
FIG. 1 is a flowchart illustrating example method steps according to some embodiments.

FIG. 1 illustrates an example method 100 for controlling a vehicle according to some embodiments.

The method comprises determining whether one or more surrounding vehicles demonstrate threatening behavior, as illustrated by step 130.

Determining whether one or more surrounding vehicles demonstrate threatening behavior may comprise interpreting information regarding surrounding vehicles acquired by one or more external sensors mounted on the vehicle. Example sensors include, but are not limited to, image sensors (e.g., cameras), RADAR sensors, and LIDAR sensors.

In some embodiments, the method comprises acquiring information regarding surrounding vehicles from one or more external sensors mounted on the vehicle, as illustrated by optional step 110.

Alternatively or additionally, the method may comprise interpreting information regarding surrounding vehicles, as illustrated by optional step 120.

Example approaches that may be used in the interpretation includes, but are not limited to, image recognition, distance estimation, speed estimation, and velocity estimation.

For example, the interpretation may provide as result one or more threat determining metric associated with the one or more surrounding vehicles. It may then be determined that surrounding vehicles demonstrate threatening behavior if the threat determining metric(s) fulfill one or more threatening behavior criteria. An example of a threatening behavior criterion is when a threat determining metric falls on a first side of (e.g., exceeds or subceeds) a metric threshold.

The one or more threat determining metric associated with a surrounding vehicle may, for example, comprise one or more of a speed of the surrounding vehicle, a velocity of the surrounding vehicle, a difference between speed of the surrounding vehicle and speed of the vehicle (i.e., a relative speed), a difference between velocity of the surrounding vehicle and velocity of the vehicle (i.e., a relative velocity), a distance between the surrounding vehicle and the vehicle, and a trend (increasing/decreasing) of the distance between the surrounding vehicle and the vehicle.

Figure 2:
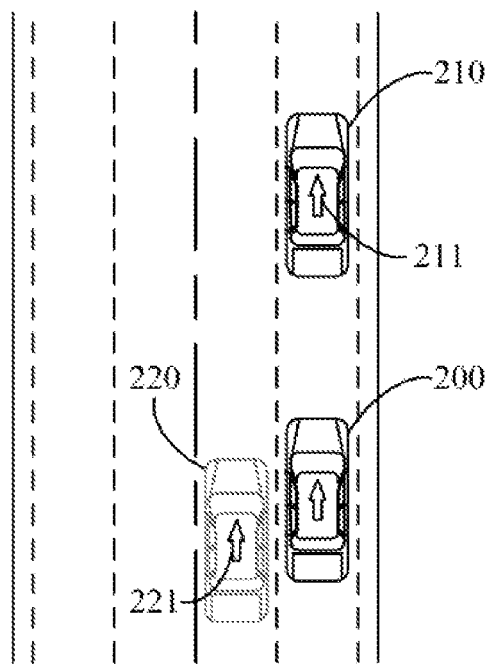
FIG. 2 is a schematic drawing illustrating example threatening scenarios according to some embodiments.

A potentially threatening situation wherein it may be determined that one or more surrounding vehicles demonstrate threatening behavior comprises a first surrounding vehicle, which is directly in front of the vehicle, slowing down in absence of traffic related reason to slow down. This situation is illustrated in FIG. 2.

A suitable threat determining metric may then include a trend of the speed (acceleration/retardation) of the first surrounding vehicle, and a threatening behavior criterion may be retardation being above a first threshold value, possibly combined with traffic related information.

Examples of traffic related reasons to slow down include other vehicle(s) (in front of the first surrounding vehicle) also slowing down, a queueing indication, a speed limit change (decreasing speed limit), an upcoming junction or road bend, decreasing visibility (e.g., due to fog, rain, or snow), an obstacle in front of the first surrounding vehicle (e.g., an animal or a fallen tree), etc. Traffic related information may be acquired in any suitable way, e.g., through image sensors, from a navigation system, from a cloud service, etc.

A potentially threatening situation wherein it may be determined that one or more surrounding vehicles demonstrate threatening behavior comprises a first surrounding vehicle, which is directly in front of the vehicle, slowing down in absence of traffic related reason to slow down combined with a second surrounding vehicle in an adjacent lane to the vehicle (typically the adjacent lane to the left in the travelling direction) slowing down in association with (e.g., keeping substantially the same speed as the first surrounding vehicle) the first surrounding vehicle. For example, the second surrounding vehicle may be an autonomous car set up to follow the first surrounding vehicle (which may be autonomous or manually operated) in the neighbouring lane and at a certain distance behind the first surrounding vehicle. This situation is also illustrated in FIG. 2.

Suitable threat determining metrics may then include speeds of the first and second surrounding vehicles, and a trend of the speed of the first surrounding vehicle. A threatening behavior criterion may be retardation of the first surrounding vehicle being above a first threshold value while a difference between the speeds of the first and second surrounding vehicles is below a second threshold value, possibly combined with traffic related information.

Further examples of potentially threatening situations wherein it may be determined that one or more surrounding vehicles demonstrate threatening behavior comprise a surrounding vehicle approaching fast behind the vehicle, a surrounding vehicle closing up from the side of the vehicle (potential ramming), a surrounding vehicle approaching in the same lane as the vehicle but in opposite direction, surrounding vehicles blocking alternative routes of the vehicle without traffic related reasons, etc.

When the vehicle is stationary, or has a speed below a threshold value, examples of potentially threatening situations include one or more doors of surrounding vehicles being open/opened, one or more persons approaching the vehicle, one or more persons outside the vehicle wearing face mask, one or more persons outside the vehicle carrying a weapon (e.g., a gun, a knife, a knuckle-duster, or similar), etc.

The further examples may be combined with the above examples in any suitable manner to define potentially threatening situations. For example, a potentially threatening situation wherein it may be determined that one or more surrounding vehicles demonstrate threatening behavior comprises a first surrounding vehicle, which is directly in front of the vehicle, slowing down in absence of traffic related reason to slow down combined with a second surrounding vehicle in an adjacent lane to the vehicle slowing down in association with the first surrounding vehicle and a third surrounding vehicle approaching fast behind the vehicle.

When it is determined that one or more surrounding vehicles demonstrate threatening behavior (Y-path out of step 140), the method comprises controlling the vehicle to perform one or more threat evasive actions, as illustrated by step 150. For example, step 150 may comprise generating one or more control signals and transmit the generated signals to respective parts of the vehicle to cause performance of the one or more threat evasive actions.

When it is determined that no surrounding vehicles demonstrate threatening behavior (N-path out of step 140), the method may avoid causing the vehicle to perform any threat evasive actions. Alternatively or additionally, the method may continue monitoring surrounding vehicles for threatening behavior when it is determined that no surrounding vehicles demonstrate threatening behavior (N-path out of step 140), as illustrated by the loop-back in FIG. 1.

Typically, the controlling step 150 may be an automatic step performed directly responsive to a determination that one or more surrounding vehicles demonstrate threatening behavior.

However, in some embodiments, determination that one or more surrounding vehicles demonstrate threatening behavior may trigger generation of a query to a vehicle occupant, inquiring whether or not the one or more threat evasive actions should be performed.

The threat evasive actions may be performed in response to an instruction to proceed being received via a user interface in such embodiments. Alternatively or additionally, the threat evasive actions may, in such embodiments, be performed in response to absence of any instruction being received via the user interface (e.g., during a specified duration of time starting when the query is issued). Yet alternatively or additionally, performance of the threat evasive actions may be canceled/aborted in response to an instruction not to proceed being received via the user interface.

According to some embodiments, determination that one or more surrounding vehicles demonstrate threatening behavior may trigger generation of a query to a remote controller, inquiring whether or not the one or more threat evasive actions should be performed.

The threat evasive actions may be performed in response to an instruction to proceed being received from the remote controller in such embodiments. Alternatively or additionally, the threat evasive actions may, in such embodiments, be performed in response to absence of any instruction being received from the remote controller (e.g., during a specified duration of time starting when the query is issued). Yet alternatively or additionally, performance of the threat evasive actions may be canceled/aborted in response to an instruction not to proceed being received from the remote controller.

The remote controller may be completely computer-implemented, or may involve a human control operator and a user interface rendering audio and/or imagery from the vehicle.

Termination of the one or more threat evasive actions could, similarly, be automatic (e.g., after some duration of time has passed, responsive to the threat being considered removed, etc.), or depending on instructions from a vehicle occupant or a remote controller.

Some example threat evasive actions include visual deterrent maneuvers (e.g., shining or blinking some or all lights of the vehicle), audial deterrent maneuvers (e.g., sounding the horn of the vehicle), intrusion mitigating maneuvers (e.g., lock all doors of the vehicle, raising all windows of the vehicle, activate shielding of the vehicle such as bullet-proofing, release a spray such as pepper spray, tear gas, fogging spray, or deoxyribonucleic acid—DNA—spray), disabling of a collision avoidance system (e.g., to be able to ram a surrounding vehicle), taking of an available escape route (e.g., by reversing and/or turning; possibly off-road), initiation of an emergency call (possibly including transmission, rendering, and/or recording of audio and/or imagery—stills or video), and initiation of a call to a remote controller (possibly including transmission, rendering, and/or recording of audio and/or imagery—stills or video). The threat evasive actions may be performed alone or in any suitable combination.

FIG. 2 schematically illustrate an example vehicle 200 in a threatening scenario, wherein it may be determined that one or more surrounding vehicles 210, 220 demonstrate threatening behavior.

In this scenario, a first surrounding vehicle 210 is directly in front of the vehicle 200 (traveling in the same direction as the vehicle 200). If the first surrounding vehicle 210 begins to slow down (retardation; decreasing speed 211) for no apparent reason (e.g., in absence of traffic related reason to slow down), this may be determined as a demonstration of threatening behavior according to some embodiments.

Possibly, the above criterion for threatening behavior may be supplemented by a second surrounding vehicle 220 in an adjacent lane to the vehicle slowing down in association with the first surrounding vehicle 210 (e.g., speeds 211 and 221 being substantially equal).

An example will now be elaborated on to illustrate how the method 100 may be implemented.

The vehicle recognizes that it is being rammed to the side of the road by using an exterior camera (e.g., 360 degree camera), a radar system, and/or vehicle-to-vehicle (V2V) communication. If the vehicle notices that one vehicle is driving in decreasing speed in front of it, another vehicle to the side is driving in the same decreasing speed, and no other vehicle is in front of either of them, this may be determined as threatening behavior. The vehicle may also be configured to recognize if doors of the other vehicles are being open/opened and/or if persons are walking towards the rammed vehicle.

When threatening behavior is recognized, the proposed system could automatically connect to a communication service, where an operator can use the camera and/or other sensors remotely to see what is happening live.

If the operator judges that there is threatening behavior, the operator may activate one or more threat mitigating functions of the vehicle (e.g., blinking all lights and/or sounding the horn) and/or inform the authorities (e.g., via an emergency call) so that the police may be able to intervene.

Alternatively or additionally, the threat mitigating functions of the vehicle may be configured for automatic activation; without the interaction with a remote operator. For example, the threat mitigating functions may be activated automatically when the vehicle does not have Internet coverage.

Figure 3:
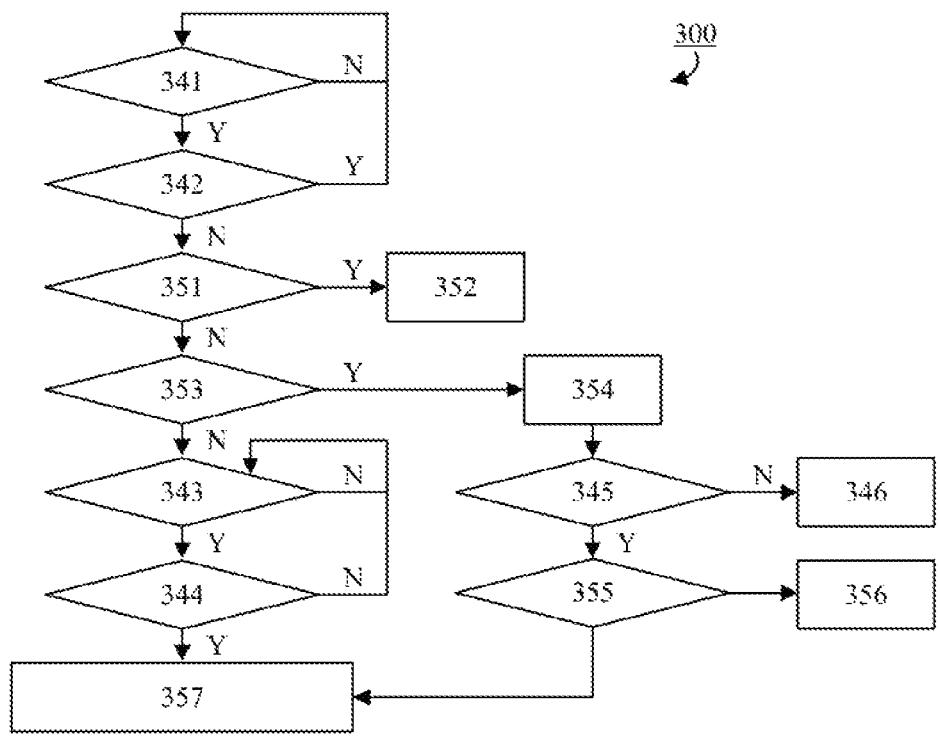
FIG. 3 is a flowchart illustrating example method steps according to some embodiments.

FIG. 3 illustrates an example method 300 according to some embodiments. The method 300 may be seen as an example implementation of the method 100 of FIG. 1.

In step 341, it is determined if there is a (first) vehicle driving in front with decreasing speed. If so (Y-path out of step 341), the method continues to step 342. If not (N-path out of step 341), the method loops back to step 341 and continues monitoring.

In step 342, it is determined if there are other vehicles driving in front of the first vehicle, which are also decreasing their speed, and/or if there is another obstacle in front of the first vehicle (e.g., an animal or a fallen tree). If so (Y-path out of step 342), the method loops back to step 341 and continues monitoring. If not (N-path out of step 342), the method continues to step 351.

In step 351, it is determined if there is any escape route, which is not blocked by another (second) vehicle. If so (Y-path out of step 351), the method continues to step 352 where the escape route is taken. If not (N-path out of step 351), the method continues to step 353.

In step 353, it is determined if coverage is available for contacting a remote operator. If so (Y-path out of step 353), the method continues to step 354. If not (N-path out of step 353), the method continues to step 343.

In step 343, it is determined if doors of the first or second vehicles are open. If so (Y-path out of step 343), the method continues to step 344. If not (N-path out of step 343), the method loops back to step 343 and continues monitoring doors.

In step 344, it is determined if persons are walking towards the vehicle and/or if image recognition reveals unfriendly facial expressions or covered faces. If so (Y-path out of step 344), the method continues to step 357. If not (N-path out of step 344), the method loops back to step 343 and continues monitoring.

In step 354, a remote operator is contacted, and in step 345 the remote operator determines if there are indications of threatening behavior. If so (Y-path out of step 345), the method continues to step 355. If not (N-path out of step 345), the method continues to step 346 where the method ends without further actions.

In step 355, the remote operator selects one or more actions to be taken. If it is selected to contact authorities, the method continues to step 356 where an emergency call is initiated. If, alternatively or additionally, other actions are selected, the method continues to step 357.

In step 357 threat mitigation may be performed by the vehicle; e.g., blinking all lights and/or sounding the horn.

Steps 341-346 may be seen as implementations of determining whether one or more surrounding vehicles demonstrate threatening behavior (compare with 130-140 of FIG. 1).

Steps 351-357 may be seen as implementations of controlling the vehicle to perform one or more threat evasive actions (compare with 150 of FIG. 1).

FIG. 4 schematically illustrates an example arrangement for controlling a vehicle according to some embodiments. The arrangement may be a system suitable for installation (or installed) in a vehicle. The arrangement comprises a controller (CNTR; e.g., controlling circuitry, processing circuitry, a control module, or a control unit) 400, which may be comprised in any suitable apparatus.

For example, the system (e.g., the controller 400) may be configured to execute (or cause execution of) one or more method steps as described in connection with FIGS. 1 and 3.

Particularly, the controller 400 is configured to cause determination of whether one or more surrounding vehicles demonstrate threatening behavior (compare with 130 of FIG. 1) and—responsive to determination that one or more surrounding vehicles demonstrate threatening behavior (compare with 140 of FIG. 1)—control of the vehicle to perform one or more threat evasive actions (compare with 150 of FIG. 1).

To this end, the controller 400 may comprise, or be otherwise associated with (e.g., be connected, or connectable, to) one or more of a determiner (DET; e.g., determination circuitry or a determination module) 402 and a evasive action trigger (EVA; e.g., triggering circuitry or a triggering module) 403. The determiner 402 may be configured to determine whether one or more surrounding vehicles demonstrate threatening behavior. The evasive action trigger 403 may be configured to control the vehicle to perform one or more threat evasive actions responsive to determination that one or more surrounding vehicles demonstrate threatening behavior.

As mentioned before, the one or more threat evasive actions may comprise one or more of activating a visual deterrent maneuver, activating an audial deterrent maneuver, activating an intrusion mitigating maneuver, disabling a collision avoidance system, taking an available escape route, initiating an emergency call, and initiating a call to a remote controller.

For example, the controller 400 (e.g., the evasive action triggerer 403) may be configured to control the vehicle to perform one or more threat evasive actions by issuing one or more control signals for one or more respective threat mitigators.

Example threat mitigators include, but are not limited to, visual interfaces (e.g., vehicle lights), audial interfaces (e.g., vehicle horn), intrusion mitigators (e.g., locks, shields, spraying devices, etc.), a collision avoidance system deactivator, a route planner, and a remote communication system (e.g., a wireless communication system suitable for emergency calls and/or calls to a remote controller).

In some embodiments, the arrangement further comprises one or more intrusion mitigators; e.g., a visual interface (VIS) 421, an audial interface (AUD) 422, an intrusion mitigator (INTR) 423, a collision avoidance system (CAS) 424, a route planner (RP) 425, and a remote communication system (RCS) 426.

In some embodiments, the controller 400 is further configured to cause acquisition of information regarding surrounding vehicles from one or more sensors (SENS) 410 (compare with 110 of FIG. 1). For example, the controller may be configured to acquire (e.g., receive) such information from the sensors.

The sensors 410 may be comprised in the arrangement according to some embodiments. Furthermore, the sensors 410 may be mountable on the vehicle (typically on the exterior of the vehicle). Example sensors have already been elaborated on above.

In some embodiments, the controller 400 is further configured to cause interpretation of information regarding surrounding vehicles (compare with 120 of FIG. 1); e.g., to provide one or more threat determining metric associated with the one or more surrounding vehicles that can be used to determine whether surrounding vehicles demonstrate threatening behavior.

To this end, the controller 400 may comprise, or be otherwise associated with (e.g., be connected, or connectable, to) an interpreter (INT; e.g., interpretation circuitry or an interpretation module) 401. The interpreter 401 may be configured to interpret information regarding surrounding vehicles; e.g., to provide one or more threat determining metric associated with the one or more surrounding vehicles. Example interpretation approaches have already been elaborated on above.

FIG. 5 schematically illustrates an example vehicle 590 (compare with 200 of FIG. 2) according to some embodiments. The vehicle 590 comprises an arrangement (e.g., the arrangement of FIG. 4) for controlling a vehicle according to some embodiments.

The arrangement comprises a controller 500 (compare with 400 of FIG. 4) configured to cause determination of whether one or more surrounding vehicles demonstrate threatening behavior and—responsive to determination that one or more surrounding vehicles demonstrate threatening behavior—control of the vehicle 590 to perform one or more threat evasive actions.

The vehicle also comprises one or more sensors 510 (compare with 410 of FIG. 4) and one or more intrusion mitigators 520 (compare with 421-426 of FIG. 4).

In conclusion, some embodiments provide mitigation of threatening behavior, e.g., prevention of ramming autonomous vehicle to rob passengers or strip the vehicle for parts.

The threatening behavior scenario is particularly relevant for autonomous vehicles since it is comparatively easy to predict in their behavior. For example, a manually driven vehicle can easily cause an autonomous vehicle to pull to a halt at the side of the road (e.g., by driving slowly in front of the autonomous vehicle and then stopping, possibly while another—autonomous or manually driven—vehicle drives along the side of the autonomous vehicle, preventing it from escaping).

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a vehicle.

Embodiments may appear within an electronic apparatus (such as a vehicle part/system) comprising arrangements, circuitry, and/or logic according to any of the embodiments described herein. Alternatively or additionally, an electronic apparatus (such as a vehicle part/system) may be configured to perform methods according to any of the embodiments described herein.

According to some embodiments, a computer program product comprises a tangible, or non-tangible, computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC; e.g., data processing circuitry or a data processing unit) 620, which may, for example, be comprised in a vehicle part/system 610. When loaded into the data processor, the computer program may be stored in a memory (MEM) 630 associated with or comprised in the data processor. According to some embodiments, the computer program may, when loaded into and run by the data processor, cause execution of method steps according to, for example, any of the methods illustrated in FIGS. 1-2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A method for controlling a vehicle, the method comprising:
   automatically determining that one or more surrounding vehicles demonstrates threatening behavior by:
      acquiring, with one or more sensors mounted on the vehicle, information regarding a first surrounding vehicle directly in front of the vehicle; and
      interpreting the information, with a controller, to detect that the first surrounding vehicle slows down in an absence of a traffic related reason to slow down in conjunction with detecting, based on further information from the one or more sensors, that a person approaches the vehicle; and
   upon determining that the one or more surrounding vehicles demonstrates threatening behavior, the controller automatically controlling the vehicle to perform one or more threat evasive actions selected from activating an intrusion mitigating maneuver, disabling a collision avoidance system, and taking an available escape route.

2. The method of claim 1, wherein interpreting the information includes establishing one or more threat determining metrics associated with the one or more surrounding vehicles.

3. The method of claim 2, wherein the one or more threat determining metrics associated with the one or more surrounding vehicles comprise one or more of a speed of the one or more surrounding vehicles, a velocity of the one or more surrounding vehicles, a difference between speed of the one or more surrounding vehicles and a speed of the controlled vehicle, a difference between velocity of the one or more surrounding vehicles and a velocity of the controlled vehicle, a distance between the one or more surrounding vehicles and the controlled vehicle, or a trend of the distance between the one or more surrounding vehicles and the controlled vehicle.

4. The method of claim 1, wherein determining that one or more surrounding vehicles demonstrates threatening behavior further comprises detecting that a second surrounding vehicle blocks a route of the vehicle alternative to forward progression.

5. The method of claim 4, wherein the second surrounding vehicle that blocks the route of the vehicle alternative to forward progression is in an adjacent lane to the vehicle and slows down in association with the first surrounding vehicle.

6. A non-transitory computer readable medium storing a computer program comprising program instructions, the computer program being loadable into a data processing unit and configured to cause execution of the method according to claim 1 when the computer program is run by the data processing unit.

7. An apparatus for controlling a vehicle, the apparatus comprising controlling circuitry configured to:
  receive information regarding surroundings of the vehicle from one or more sensors mounted on the vehicle;
  automatically determine that one or more surrounding vehicles demonstrates threatening behavior by:
    interpreting the received information related to a first surrounding vehicle located directly in front of the vehicle to detect that the first surrounding vehicle slows down in an absence of a traffic related reason to slow down in conjunction with detecting, based on further information from the one or more sensors, that a person approaches the vehicle; and
  responsive to the determination that the one or more surrounding vehicles demonstrates demonstrate threatening behavior, automatically control of the vehicle to perform one or more threat evasive actions selected from activating an intrusion mitigating maneuver, disabling a collision avoidance system, and taking an available escape route.

8. The apparatus of claim 7, wherein the controlling circuitry is further configured to interpret the information regarding surrounding vehicles to establish one or more threat determining metrics associated with the one or more surrounding vehicles, wherein determination of threatening behavior is based on the one or more threat determining metrics.

9. The apparatus of claim 8, wherein the one or more threat determining metrics comprise one or more of a speed of the one or more surrounding vehicles, a velocity of the one or more surrounding vehicles, a difference between speed of the one or more surrounding vehicles and a speed of the controlled vehicle, a difference between velocity of the one or more surrounding vehicles and a velocity of the controlled vehicle, a distance between the one or more surrounding vehicles and the controlled vehicle, or a trend of the distance between the one or more surrounding vehicles and the controlled vehicle.

10. The apparatus of claim 7, further comprising:
  the one or more sensors, the one or more sensors being externally mountable on the vehicle.

* * * * *